United States Patent [19]
Parker

[11] 3,953,327
[45] Apr. 27, 1976

[54] SEWAGE TREATMENT PROCESS
[75] Inventor: Denny S. Parker, Berkeley, Calif.
[73] Assignee: Central Contra Costa Sanitary District, Walnut Creek, Calif.
[22] Filed: Aug. 29, 1974
[21] Appl. No.: 501,753

Related U.S. Application Data
[63] Continuation of Ser. No. 354,804, April 26, 1973, abandoned.

[52] U.S. Cl. .................................. 210/7; 210/16; 210/18; 210/DIG. 27
[51] Int. Cl.² .......................................... C02C 5/10
[58] Field of Search .................................. 210/4–8, 210/16, 15, 11, 18, 17, 14, 195, 197

[56] References Cited
UNITED STATES PATENTS

| | | | |
|---|---|---|---|
| 3,617,540 | 11/1971 | Bishop et al. | 210/16 |
| 3,654,147 | 4/1972 | Levin et al. | 210/16 |
| 3,709,364 | 1/1973 | Savage | 210/11 |
| 3,817,857 | 6/1974 | Torpey | 210/17 |
| 3,849,303 | 11/1974 | Torpey | 210/16 |

OTHER PUBLICATIONS
Climenhage D. C.; "Biological Denitrification of Nylon Intermediates Waste Water" 22nd Canadian Chemicals Engineering Conf. Sept. 17-20 (1972).
Parker et al.; "Full Scale Test Plant at Contra Costa Turns Out Valuable Data on Advanced Treatment" Bull. of the Calif. W.P.C.A. Vol. 9 No. 1 (July 1972).

Primary Examiner—Charles N. Hart
Assistant Examiner—Benoit Castel
Attorney, Agent, or Firm—Lothrop & West

[57] ABSTRACT

A sewage treatment process is especially applicable to sewage that has been supplied with methanol to undergo anoxic denitrification. During anoxic denitrification bacteria use the methanol for food while reducing nitrates and nitrites to nitrogen gas and other products. From such denitrification step the sewage is subjected to stabilization by aeration for a time, e.g. 50 minutes, during which some contained protozoans, e.g. ciliates and rotifers, multiply. From the stabilization by aeration step the material is subjected to a mildly aerated, physical conditioning step and then clarification step. Resulting sludge is recycled to the denitrification step and separated, relatively clear effluent is removed from the process.

9 Claims, 1 Drawing Figure

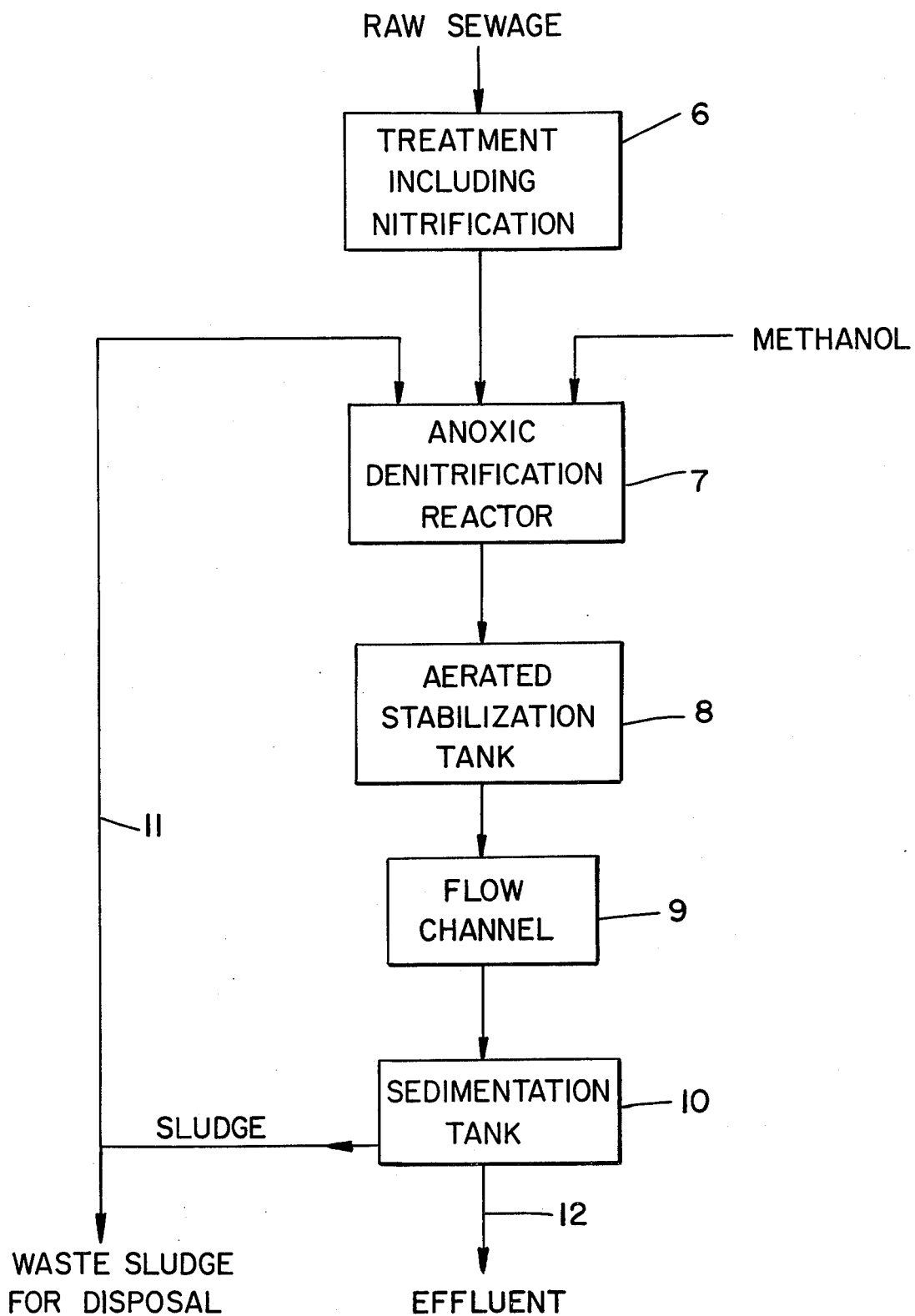

SEWAGE TREATMENT PROCESS

This is a continuation of application Ser. No. 354,804, filed Apr. 26, 1973, and now abandoned.

It becomes increasingly necessary to treat material, referred to generally as sewage, in a fashion to recover from such material at least the liquid content in a form re-usable for various economic purposes. Various processes and mechanisms have been provided for this purpose and many of them, although operating well under relatively small-scale, controlled conditions, do not in large scale operation or in large quantities perform as well without extremely costly control and supervision.

Some of the processes, theoretically effective, do not in practice work out well, partly because of variations in the influent material and partly because the processes, being largely biologic, have not taken into account important biologic fluctuations.

It is therefore an object of the invention to provide an improved sewage treatment process.

A further object of the invention is to provide a sewage treatment process that is within itself sufficiently stable and inherently flexible as to produce a reasonably stable product despite variant conditions.

Another object of the invention is to provide a sewage treatment process that is effective, economical and satisfactory on a large scale.

A further object of the invention is to provide a sewage treatment process that affords a liquid effluent of more than adequate purity for many economic purposes.

A further object of the invention is to provide a sewage treatment process in which some of the steps are in themselves well recognized but which with additional steps produce a considerably improved result.

A further object of the invention is to provide a sewage treatment process effective to utilize various biologic processes in appropriate surroundings for beneficial results.

Other objects of the invention, together with the foregoing, are attained in the process set forth in the accompanying description and illustrated in the accompanying drawing, in which:

The FIGURE is a block diagram, flow sheet illustrating the sewage treatment process of the invention.

While the process of the present invention can be applied to various different effluents, referred to as sewage, in order to reclaim some of the constituents thereof, particularly liquid, for further economic use, the process has been particularly successful in connection with sewage treatment processes in which the raw sewage, containing micro-organisms, liquid and some solids, has first been treated in a well-known fashion to induce or produce nitrification. This normally involves the utilization of various micro-organisms, bacteria, protozoa and others, which are effective to alter the constituency of the influent. It is particularly after the raw material has been so treated to nitrification that the present process is concerned.

Nitrified sewage or raw sewage treated by any acceptable manner of nitrification, as represented by the block 6, is advanced to a successive step represented by the block 7 in which the already nitrified, formerly raw sewage is treated for denitrification. The block 7 represents, as an example, a reaction vessel generally closed to the atmosphere so that its operation is anoxic. The reaction vessel is not only supplied with the original, nitrified material from the step 6 but likewise is supplied with an influx of methanol or comparable, available carbon reagent.

Within the denitrification reactor the influent nitrified sewage and the methanol are retained for a sufficient residence time so that a biologic denitrification reaction takes place. In the usual instance, a residence time of the order of fifty minutes under temperate conditions has been found to be entirely satisfactory for this particular step. However, material from the reactor vessel represented by the block 7 is greatly improved if, as a next step represented by the block 8, the reacted material is advanced to a location separate from the anoxic denitrification reactor and is transferred to an aerated stabilization tank represented by the block 8.

In the aerated stabilization step, the material from the reactor is not only exposed to oxygen but is thoroughly aerated. There is mechanical agitation of the material by means of air injection aeration or comparable mechanical intermixture with air so that the biologic reactions, previously anoxic, continue or initiate in the presence of substantial oxygen. In this particular step the retention time has been found to be satisfactory, particularly in temperate climates when it is substantially the same as that in the reactor and also is of the order of 50 minutes.

During time in step 8 the normally present protozoans, such as the ciliates and the rotifers, are exposed to oxygen and are permitted substantially to multiply and greatly to exceed their original relative quantity. The increase in population in step 8 of the ciliates and rotifers and comparable protozoans is effective largely to clarify the liquid portion of the content. The presence of oxygen furthermore has a marked effect to reduce or eliminate any sulfide odors which heretofore have been detected. As a result the levels of biodegradable organics are far less than would be the case without step 8.

Retention in the stabilization step 8 insures stabilization of the contained sludge and of the associated liquid. More particularly, it has been observed that any excess methanol which carries over from step 7 is itself oxidized in the stabilization tank, step 8. Thus, the control of the process is much less critical than heretofore. That is, it has been observed previously that unless the methanol introduction, step 7, is most meticulously regulated, any excess carries through the remaining processing and is deleterious. But with the aerated stabilization, step 8, excess methanol is substantially consumed in this step and does not then carry over.

The aerated stabilization tank stabilizes the sludge by reducing excess sludge production. For example, the sludge production may be about 4 milligrams per liter of solids as distinguished from conventional operation producing from 14 to 16 milligrams per liter of solids when the nitrate removed is 25 to 30 milligrams per liter, expressed as N.

After the approximate fifty minute residence time in the aerated stabilization tank, step 8, the material therefrom is discharged through a flow channel, step 9. Preferably this is done by flowing the liquid and associated sludge together through an open flow channel. This may be mildly aerated. Physical conditioning occurs so that the sewage is in a well flocculated stage as it flows from the channel, step 9, into a sedimentation tank, step 10. Clarification may be accomplished by any suitable form of conventional sedimentation tank. This step is effective to deposit the sludge material and to release such sludge from the supernatent liquid material. The sludge is carried from the sedimentation tank, step 10, through a recycling circuit 11 and is reintroduced to the denitrification reactor, step 7; that is, again subjected to the methanol environment for retreatment. The residual material from the sedimentation tank, step 10, is carried through a discharge 12 and constitutes an effluent removed from the process. Occasionally, excess sludge may be wasted from the circuit 11.

What is claimed is:

1. A process for treating sewage containing nitrogen compounds consisting essentially of the steps of first converting nitrogen compounds to the nitrate form by subjecting the sewage to nitrification, then subjecting the nitrified sewage to substantially anoxic denitrification in the presence of methanol, then stabilizing the denitrified sewage from the denitrification step by thoroughly aerating the sewage under conditions of agitation, then flowing said sewage from the stabilization step, then clarifying the flowing sewage to produce sludge and an effluent, recycling said sludge directly to said denitrification step to subject said sludge also to substantially anoxic denitrification, and withdrawing said effluent from the process.

2. A process as in claim 1 in which said stabilization step has a residence time substantially the same as said denitrification step.

3. A process as in claim 1 in which said denitrification step has a residence time of about fifty minutes.

4. A process as in claim 1 in which residual methanol from said denitrification step is passed into said stabilization step, and said stabilization step has a residence time sufficient to oxidize substantially all of said residual methanol.

5. A process as defined in claim 1, wherein said stabilization step has a residence time of approximately 50 minutes.

6. A process as defined in claim 1, wherein said step of flowing said sewage from the stabilization step includes mild aeration of said sewage while conducting same through a flow channel.

7. A process as defined in claim 6, wherein said sewage is mildly aerated while being conducted through an open flow channel.

8. A process as defined in claim 1, wherein said aerated stabilization step comprises agitating said sewage by means of air injection aeration.

9. A process as defined in claim 1, wherein said aerated stabilization step comprises mechanically intermixing said sewage with air.

* * * * *